United States Patent [19]

Kojima et al.

[11] 4,150,398

[45] Apr. 17, 1979

[54] LINEAR METHOD OF OPTICALLY RECORDING A VIDEO OR OTHER SIGNAL

[75] Inventors: Chiaki Kojima, Yokohama; Hiroshi Ohki, Tokyo; Yuzuru Yanagisawa, Fujisawa, all of Japan

[73] Assignee: Sony Corporation, Tokyo, Japan

[21] Appl. No.: 648,006

[22] Filed: Jan. 12, 1976

[30] Foreign Application Priority Data

Jan. 17, 1975 [JP] Japan .................................. 50-7494

[51] Int. Cl.² .............................................. H04N 5/76
[52] U.S. Cl. .............................. 358/128; 179/100.4 C; 179/100.3 V; 96/27 H; 96/35.1; 96/36; 96/27 R; 358/132
[58] Field of Search ................. 179/100.4 C, 100.3 V, 179/100.3 A; 178/6.7 A, 6.7 R, 6.6 TP, 6.6 B, 6.6 DD, 6.6 R; 346/135; 340/173 LS; 96/27 H, 35.1, 36, 27 R, 39; 274/41.6 PP; 358/127, 128, 130, 132, 129; 365/106, 120

[56] References Cited

U.S. PATENT DOCUMENTS

| | | | |
|---|---|---|---|
| 1,512,681 | 10/1924 | Engl | 274/41.6 PP |
| 1,601,078 | 9/1928 | MacKenzie | 274/41.6 PP |
| 3,627,916 | 12/1971 | Bestenreiner | 179/100.3 V |
| 3,657,471 | 4/1972 | Sasabe | 178/6.7 A |
| 3,728,117 | 4/1973 | Heidenhain | 96/27 H |
| 3,737,589 | 6/1973 | Redlich | 179/100.4 C |
| 3,894,179 | 7/1975 | Jacobs | 178/6.6 R |
| 3,902,011 | 8/1975 | Goshima | 179/100.4 C |
| 4,027,330 | 5/1977 | Maslowski | 179/100.4 C |

OTHER PUBLICATIONS

Videotape Recording, by J. L. Bernstein, © 1960, by John F. Rider Publisher, Inc., pp. 86-87.

Circuits, Devices and Systems, by R. J. Smith, © 1966, by John Wiley and Sons, Inc., pp. 376-377, 412-413.

*Primary Examiner*—Bernard Konick
*Assistant Examiner*—Alan Faber
*Attorney, Agent, or Firm*—Lewis H. Eslinger; Alvin Sinderbrand

[57] ABSTRACT

In optically producing a reproducible recording of video or other signals, the intensity of at least one laser light beam is modulated by the signals to be recorded while such light beam scans a substantially flat surface on a photo-sensitive recording medium which is photo-reacted to a degree varying substantially linearly in correspondence with the intensity of the light impinging thereon over a predetermined range of light intensities, and the intensity of the light beam and the degree of modulation thereof by the signals are selected to maintain the maximum and minimum intensities of the modulated light beam within such predetermined range so as to form simultaneously on the record medium a tracking path portion and a recorded signal portion which is unified with the latter. The photo-sensitive record medium is desirably constituted by a positive photo-resist so that, upon development thereof, the tracking path portion is obtained in the form of a groove having the recorded signal portion defined by irregularities at the bottom of such groove. The positive photo-resist or other photo-sensitive material may be conveniently applied as a layer on a base plate or disc which is rotated while the light beam and disc are moved relative to each other in a radial direction of the disc so that the groove or other tracking path portion forms a spiral.

10 Claims, 7 Drawing Figures

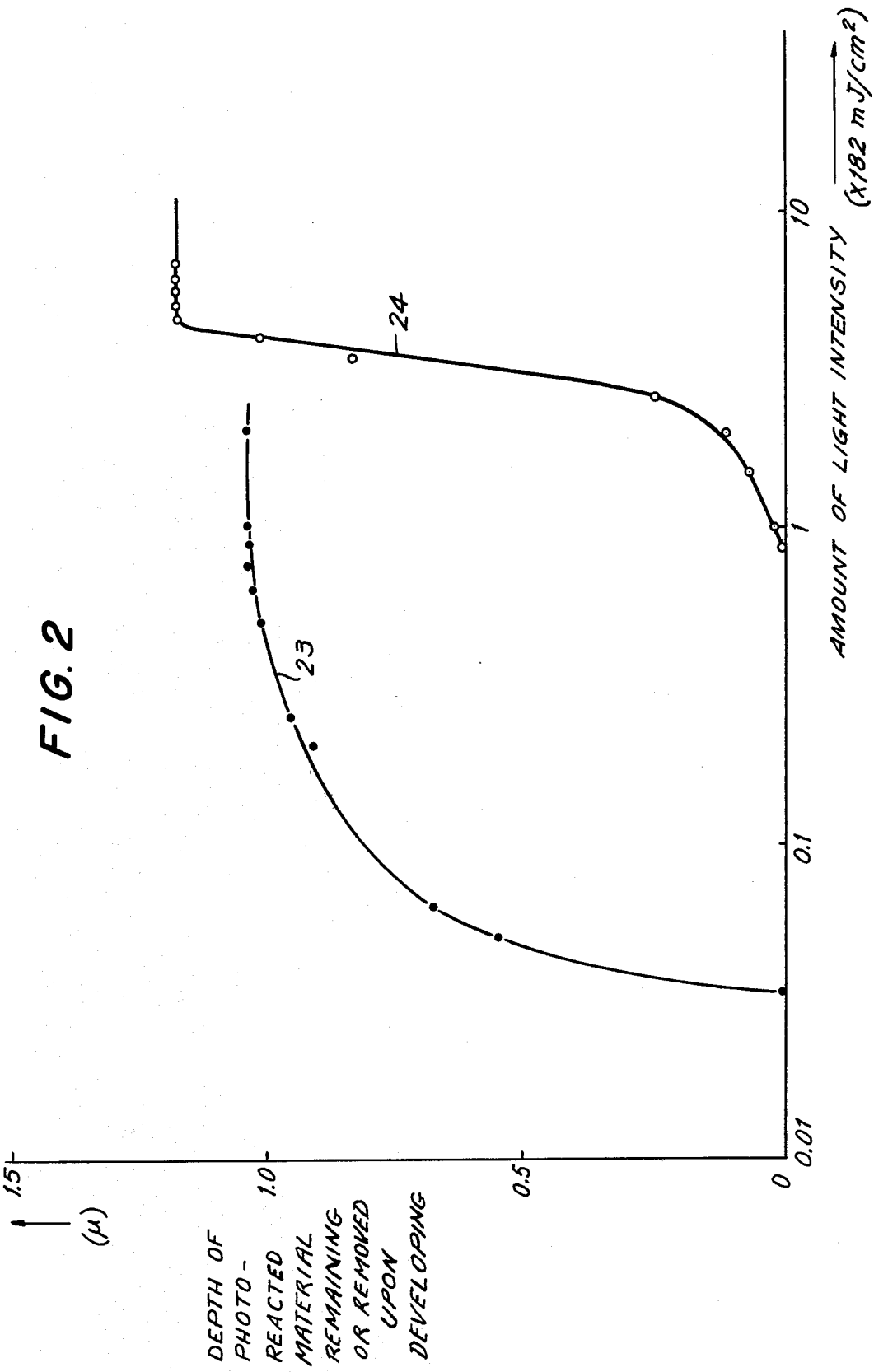

LINEAR METHOD OF OPTICALLY RECORDING A VIDEO OR OTHER SIGNAL

BACKGROUND OF THE INVENTION

1. Field of the Invention

This invention relates generally to the production of reproducible recordings of video or other signals, and more particularly is directed to methods for producing such recordings by optical means.

2. Description of the Prior Art

The disc recording of audio signals is well known, and involves the use of a lacquer disc for the original recording. Such original lacquer disc, usually constituted by an aluminium base plate with a coating of acetate plastic thereon, is placed on a recording turntable which is rotated at a suitably slow standard speed, for example, 33⅓, 45 or 78 r.p.m. During such rotation of the lacquer disc, a cutter including an electromechanical transducer and a cutting stylus is driven in the radial direction of the turntable by means of a lead screw so that the cutting stylus cuts a spiral groove in the record. As the spiral groove is being cut, electrical signals corresponding to the audio or sound signals to be recorded are applied to a driving coil of the cutter transducer for effecting corresponding vibrations of the cutting stylus with the result that undulations are formed in the spiral groove to represent the recorded signals. In mass producing phonograph record discs from such original lacquer disc, the latter is metalized and then electroplated, whereupon the plating is separated from the lacquer and reinforced by backing with a solid metal plate to produce the so-called master which is, in turn electroplated. Thereafter, by well known steps, a mother and then a stamper are produced from the master. Stampers containing the audio signals to be recorded in the opposite sides of the final phonograph record are then mounted in the upper and lower jaws of a hydraulic press, and a preform or biscuit of thermoplastic material is placed between the two stampers which are heated and pressed towards each other by closing of the jaws of the press. When an impression of the stampers has been obtained in the thermoplastic material, the stampers are cooled so as to cool and set the resulting plastic phonograph record therebetween. Finally, the jaws of the press are opened and the phonograph record is removed from the press with the modulated grooves in each face of such record corresponding to those in the respective original lacquer disc. In reproducing the audio signls thus recorded the phonograph record disc is placed on a turntable so as to turn at a constant rotational speed corresponding to that at which the recording turntable was rotated during the production of the original lacquer record. A pick-up is made to track the spiral groove in the phonograph record disc by means of a stylus or needle depending from the pick-up, and the undulations in the groove cause vibrations of the stylus or needle with the result that the pick-up transducer generates an output voltage corresponding to the audio signals represented by the undulations in the groove. Such output of the pick-up transducer, after suitable amplification and equalization, may be employed to drive a loudspeaker which provides an audible reproduction of the recorded sound.

It has also been proposed to record video signals on a record disc by a method similar to that described above for the recording of audio signals. If the resulting video record disc has one frame of the video signals recorded in each turn of its spiral groove, it will be necessary, during reproducing of the recorded video signals, to rotate the video record disc at a high speed, for example, 1,800 r.p.m. in the case of NTSC video signals. It will be apparent that, by reason of such high speed rotation of the video record disc, various technical difficulties will be encountered in reproducing the video signals recorded in the spiral groove of the record disc by means of a pick-up or transducer having a stylus which tracks the groove. Even though such technical difficulties involved in the reproducing of the recorded video signals may be overcome, the recording of the video signals by mechanical cutting of the groove in the original or lacquer record, as described above in the case of the recording of audio signals, cannot be effected with the original or lacquer record being rotated at the high speed of 1,800 r.p.m. If the original or lacquer record is rotated at such a high speed, the cutting stylus is burned by the intense heat generated as a result of the friction between the cutting stylus and the original lacquer record and, further, it is extremely difficult to provide the cutting stylus and transducer with the requisite high-frequency characteristics. Therefore, in practice, the recording of video signals by the mechanical cutting of an original lacquer record is carried out with the recording turntable being rotated at a speed which is about 1/20th the rotational speed to be used when reproducing the recorded video signals. Therefore, if a video record disc is to be provided with a playing time of 10 minutes, more than three hours will be required for the recording of the corresponding original lacquer record. Furthermore, if the original lacquer record is rotated at a relatively slow speed during the cutting of the groove therein, that is, during the recording process, video signals cannot be directly applied to the cutting transducer from a television camera or other video signal source, and it is necessary to provide a frequency converter between the signal source and the recording apparatus. Such frequency converter may employ an intermediate recording medium which is driven at a standard high speed during the recording thereon of the video signals from the television camera or other source, and is then driven at a relatively slow speed during the reproducing of the video signals from the intermediate recording medium for feeding to the recording apparatus by which the video signals are recorded as undulations or irregularities in the groove being mechanically cut in the original lacquer record during the relatively slow rotation thereof. Obviously, the long period of time required for the recording of video signals and the need to employ a frequency converter, as aforesaid, are serious disadvantages of the existing method for producing video record discs.

OBJECTS AND SUMMARY OF THE INVENTION

Accordingly, it is an object of the present invention to provide an improved method of producing a reproducible recording of video or other signals, and which avoids the above mentioned disadvantages of the existing methods therefor.

More specifically, it is an object of the invention to provide a method for producing a reproducible recording of video or other signals while simultaneously forming a tracking path associated with the recorded signals, and in which the video or other signals may be recorded as received from a source thereof, for example, a television camera.

Another object is to provide a method for optically producing a reproducible recording of video or other signals together with an associated tracking path on a photosensitive record medium from which numerous copies or records can be conveniently mass produced.

Still another object is to provide a method of producing a reproducible recording of video or other signals by employing such signals for modulating the intensity of a laser light beam which suitably scans the surface of a photo-sensitive record medium so as to form a tracking path, for example, in the form of a spiral groove, in which the recorded signals are defined by undulations or irregularities in such tracking path.

In accordance with an aspect of this invention, the intensity of at least one laser light beam is modulated by the video or other signals to be recorded while such light beam scans a substantially flat surface on a photo-sensitive record medium which is photo-reacted to a degree varying substantially linearly in correspondence with the intensity of the light impinging thereon over a predetermined range of light intensities, and the intensity of the light beam and the degree of modulation thereof by the signals being recorded are selected to maintain the maximum and minimum intensities of the modulated light beam within such predetermined range.

The above, and other objects, features and advantages of the invention, will be apparent from the following detailed description of illustrative embodiments which is to be read in connection with the accompanying drawings.

BRIEF DESCRIPTION OF THE DRAWINGS

FIG. 2 is a graph illustrating the photo-sensitive characteristics of two photo-resist materials that may be employed as the photo-sensitive record mediums in practicing the method according to this invention;

DESCRIPTION OF THE PREFERRED EMBODIMENTS

Figure 1:
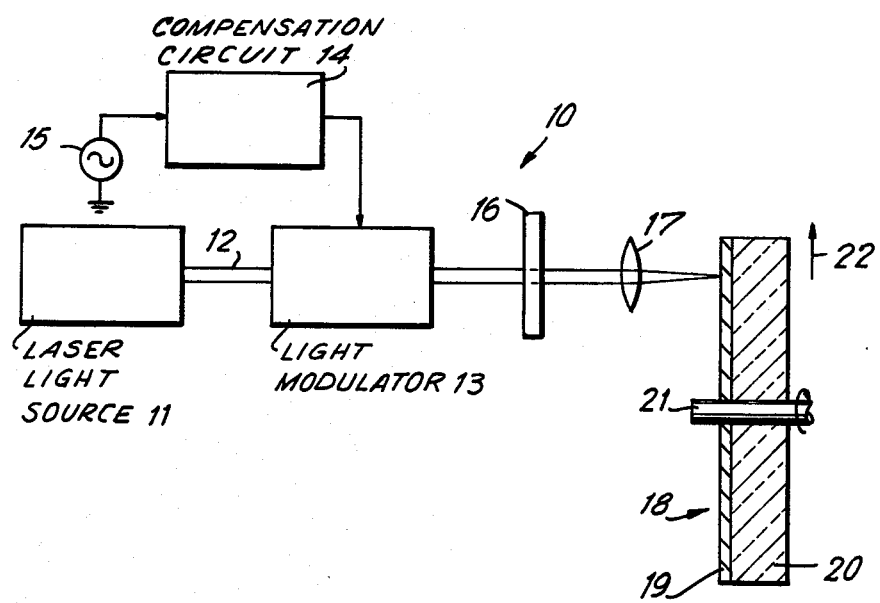
FIG. 1 is a schematic view illustrating the essential components of an apparatus that may be employed in practicing the method according to this invention for optically producing a reproducible recording of video or other signals.

Referring to the drawings in detail, and initially to FIG. 1 thereof, it will be seen that a recording apparatus 10 that may be used for practicing the method according to an embodiment of this invention generally comprises a laser light source 11 which emits a laser light beam 12 having a predetermined light intensity. The laser light beam 12 is directed through a light modulator 13 for modulating the intensity of the laser light beam in accordance with the signals to be recorded which are received by light modulator 13 through a compensation circuit 14 from a signal source 15, for example, a television camera. The compensation circuit 14 compensates for non-linearity in the photo-sensitive characteristics of the record medium, which is hereinafter described in detail, and in the modulation characteristics of the light modulator 13. The modulated laser light beam issuing from light modulator 13 is passed through a speed compensating filter 16 and then projected by a condensing lens 17 onto the substantially flat surface of a photo-sensitive record medium 18.

As shown, the record medium 18 may be conveniently in the form of an original record disc constituted by a layer 19 of photo-sensitive material coated on the surface of a glass disc or base plate 20 and having uniform thickness of about 1 micron. The disc 20 is fixed, at its center, on a shaft 21 which is rotated, for example, by an electric motor (not shown). Simultaneously with the rotation of shaft 21, and hence of the original record disc 18, the record disc 18 and laser light beam 12 are moved relative to each other in the radial direction of the original record disc, for example, the shaft 21 may be progressively moved in the direction of the arrow 22 by a conventional lead screw mechanism (not shown), so that the laser light beam 12 scans a spiral path on the surface of photo-sensitive layer 19.

It will be apparent that even though original record disc 18 is rotated at a constant speed, for example, 1,800 r.p.m. when recording NTSC video signals so as to record one frame of such video signals during each revolution of the original record disc, the linear speed of the surface of photo-sensitive layer 19 varies over the radial extent of such surface from a minimum speed adjacent to the axis of rotation of original record disc 18 to a maximum speed at the outer periphery of such record disc. Thus, even if it is assumed that the laser light beam 12 is of constant intensity, the amount of light projected on a unit area of the photo-sensitive layer 19 disposed close to the axis of rotation would be substantially greater than the amount of light projected on a similar unit area of the photo-sensitive layer disposed adjacent the outer periphery of the original record disc 18. However, in the apparatus 10 shown on FIG. 1, the speed compensating filter 16, which may be in the form of a gray scale, is suitably controlled in accordance with the movement of the original record disc 18 in the direction of the arrow 22 relative to the laser light beam 12 so as to progressively reduce the intensity of the laser light beam as the latter is directed against the surface of photo-sensitive layer 19 at locations that are progressively closer to the axis of rotation of the original record disc. Thus, the effect of the varying linear speed at the surface of the photo-sensitive layer 19 is substantially eliminated.

The photo-sensitive layer 19 of the original record disc 18 used in the method according to this invention may be of a photo-resist material, such as, for example, the negative-type photo-resist material available under the trade name KOR from the Eastman Kodak Company and containing polycinnamicvinyl as a major constituent thereof, or the positive-type photo-resist available under designation AZ-1350J from the Shipley Company, and which contains novolac resin as a major constituent thereof. The photo-sensitive characteristics of such negative-type and positive-type photo-resist materials are represented by the curves 23 and 24, respectively, on FIG. 2. On FIG. 2, the amount of light projected on a unit area of a photo-resist layer by a laser light beam having a wavelength of 4,579 Angstroms is represented by the abscissa, while the degree to which the photoresist layer is light- or photo-reacted is indicated by the ordinate as the depth of photo-resist material which remains after developing in the case of the negative-type photo-resist, or which is removed upon developing in the case of the positive-type photo-resist.

It will be seen that each of the characteristic curves 23 and 24 has an inclined portion indicating that when the amount of light received by the corresponding photo-resist material is varied in the range corresponding to such inclined portion of the characteristic curve, the degree to which the respective photoresist material is photo-reacted will be correspondingly varied. After the photo-resist layer has been exposed to light, such layer is conventionally developed. In the case of the negative-type photoresist layer having the characteristic curve 23, developing of such photo-resist layer after its exposure to light results in the removal of the unexposed portions of the layer while the light- or photo-reacted portion remains more or less undissolved in dependence on the degree or extent to which such portion has been photo-reacted. On the other hand, in the case of the positive-type photo-resist layer having the characteristic curve 24, developing of such layer after its exposure to light results in the light- or photo-reacted portion of the layer being dissolved or removed to a depth in dependence on the degree to which such layer was photo-reacted, while the portions of the layer which were not exposed to light remain undissolved by the developing process. It is to be understood that either the negative-type photo-resist material or the positive-type photo-resist material can be employed as the photo-sensitive layer 19 of the original record disc 18 used in practicing the method according to this invention.

Figure 3:
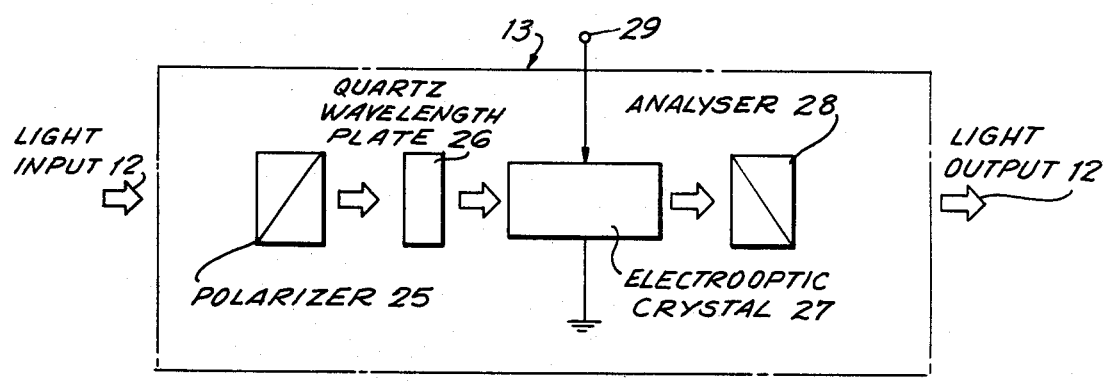
FIG. 3 is a schematic view illustrating the elements of a light modulator that may be employed in the apparatus of FIG. 1.
Figure 4:
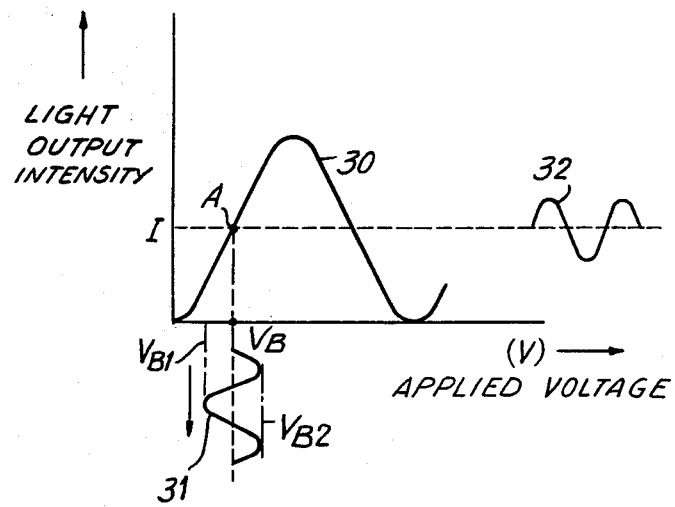
FIG. 4 is a graph showing the modulating characteristics of the light modulator of FIG. 3, and to which reference will be made in explaining the operation thereof.

Referring now to FIG. 3, it will be seen that the light modulator 13 of the recording apparatus 10 may include a polarizer 25, a quartz wavelength plate or phase controller 26, an electro-optic crystal 27 and an analyzer 28 which are successively arranged in the order named in the path of the laser light beam 12. The electro-optic crystal 27 may be a crystal of lithium niobate, lithium tantalate or the like which exhibits the electro-optic or Pockels effect, and is connected to an input terminal 29 at which the video or other signals to be recorded are received from source 15 after compensation thereof in the circuit 14. Further, the polarizer 25 and analyzer 28 are in the condition of orthogonal nicol relative to each other so that, as is known, the intensity of the laser light beam issuing from modulator 13 can be made to correspond to the signal voltage being applied to electro-optic crystal 27. More particularly, as shown on FIG. 4, if the polarizer 25 and analyzer 28 are in the condition of orthogonal nicol relative to each other, the intensity I of the laser light beam at the output of modulator 13 will be proportional to sin KV, as represented by the modulation curve 30 on FIG. 4, and in which K is a constant and V is the signal voltage applied to the electro-optic crystal 27. If the signal voltage is applied to the crystal 27 with a D.C. level $V_B$ corresponding to the point A on the modulation curve 30, and which is selected as the operating point of modulator 13, and if the signal voltage applied to crystal 27 varies about such selected operating point between the limits $V_{B1}$ and $V_{B2}$, for example, as indicated by the signal voltage curve 31 on FIG. 4, then the intensity of the laser light beam at the output of modulator 13 which is indicated by the curve 32 will be modulated in correspondence with the signal voltage 31. The operating point A on the modulating curve 30 may be established for the modulator 13 either by applying the corresponding predetermined DC voltage $V_b$ to terminal 29 in addition to the signal voltage from source 15, or the quartz wavelength plate or phase controller 26 may be selected to provide the light passing therethrough with a phase corresponding to such DC voltage $V_B$. Such alternative methods of establishing the operating point A are possible as the electro-optic effect involves the modulation of refractive index and, hence, the phase modulation of the light.

As previously mentioned, if the photo-sensitive layer 19 of the record medium or original record disc 18 is formed of a positive-type photo-resist having a photo-sensitive characteristic as represented by the curve 24 on FIG. 2 and the modulated laser light beam scans a spiral path on the surface of such layer 19, then a reduced thickness of the photo-sensitive layer 19 will remain along such spiral path after the developing of the positive-type photo-resist. Thus, upon development of the positive-type photo-resist forming the layer 19 following its exposure to the modulated laser light beam 12 along a spiral path on the surface of layer 19, a corresponding spiral groove will be formed in such surface with the depth of the spiral groove at locations along the length of the latter varying in accordance with the intensity of the modulated laser light beam when impinging at the respective locations along the spiral path scanned by such light beam.

It will be seen that the photo-sensitive characteristic curve 24 (FIG. 2) for the positive-type photo-resist and a corresponding characteristic curve 33 (FIG. 5) representing the thickness of such photo-resist remaining after development thereof, have respective inclined portions in which the degree to which the photo-resist is photo-reacted, and consequently the thickness of the photo-resist remaining after development, respectively vary substantially linearly in correspondence with the intensity of the modulated laser light beam over a predetermined range of light intensities.

Figure 5:
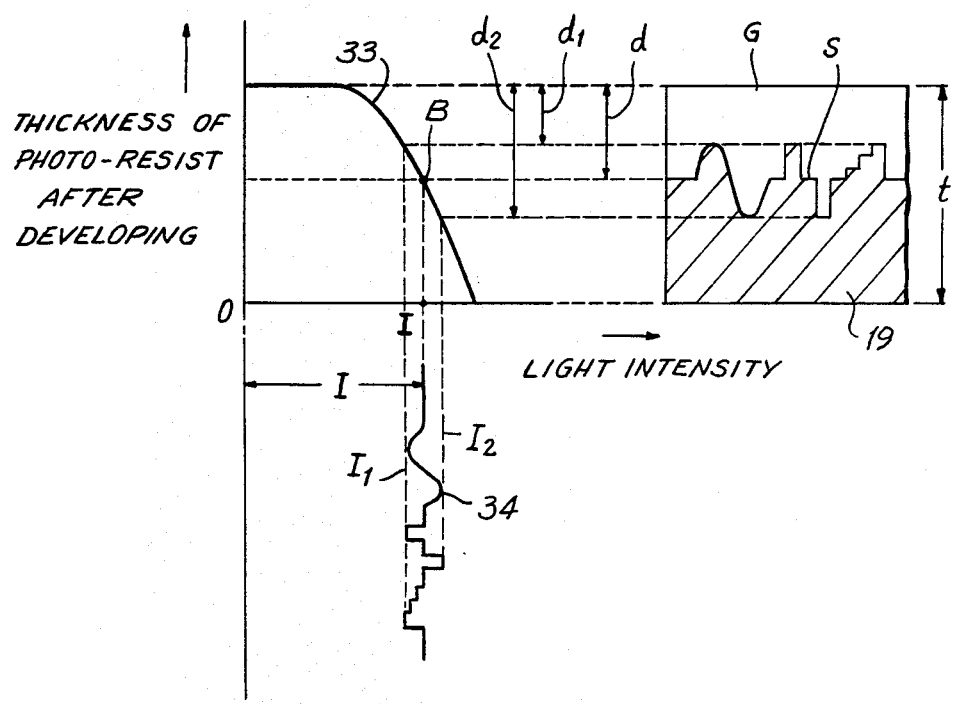
FIG. 5 shows a graph of the photo-sensitive characteristics of a record medium in association with diagrammatic illustrations of the intensity of a modulated light beam and of the resulting signal recording and tracking path, and to which reference will be made in explaining the optical recording method according to this invention.

In accordance with this invention, the intensity I of the laser light beam 12, in the absence of any modulation thereof by the video or other signals to be recorded, is selected to correspond to the point B on curve 33 (FIG. 5) which lies on the relatively straight inclined portion of such curve, and the degree of modulation of the intensity of the laser light beam 12 by the video or other signals to be recorded is selected so that the minimum and maximum values $I_1$ and $I_2$ of the modulated intensity of the laser light beam, represented by the curve 34 in FIG. 5, will be within the range of light beam intensities for which there is a substantially linear relationship between the light intensity and the thickness of the photo-resist layer 19 remaining after the development thereof. Thus, the groove G formed in the photo-resist layer 19 following the development thereof will have a nominal depth d corresponding to the point B on curve 33, that is, corresponding to the intensity of the unmodulated laser light beam, and the depth of the groove will vary between the minimum and maximum depths $d_1$ and $d_2$ corresponding to the minimum and maximum intensities $I_1$ and $I_2$, respectively, of the modulated laser light beam.

Therefore, in the developed positive-type photo-resist layer 19 of original record disc 18, the recorded video or other signals will be accurately represented by the undulations or irregularities S formed at the bottom of groove G in correspondence to the varying depth of such groove. Correspondingly, prior to the development of the photo-resist layer forming the photo-sensitive recording medium in the embodiment of the invention being here described, the exposure of the photo-resist layer to the modulated laser light beam will result in the photo-reacting of the photo-resist layer along a spiral path so as to define a tracking path portion, with the degree to which the photo-resist layer is photo-reacted along such spiral path being varied accurately in accordance with the varying intensity of the modulated laser light beam so as to define a recorded signal portion which is unified with the tracking path portion.

In a particular example of the above described method according to this invention, the photo-sensitive layer 19 of the original record disc 18 was constituted by the positive-type photo-resist available under the designation AZ-1350J and had a thickness t of 1.0 micron, and the original record disc 18 was rotated at a speed of 1,800 r.p.m. for the recording thereon of one frame of NTSC video signals during each revolution of disc 18. In such example, the original or unmodulated intensity of the laser light beam 12 and the degree of modulation of the laser light beam intensity in response to the video signals were selected to provide the minimum and maximum intensities $I_1$ and $I_2$ of the modulated laser light beam with values of 77 milliwatts and 98 milliwatts, respectively. Further, with the laser light beam 12 having a wavelength of 4,579 Angstroms and being focused by condensing lens 17 so as to impinge on the surface of layer 19 at a beam spot having a diameter 3 to 4 microns, it was found that the groove G resulting from development of the exposed photo-resist layer 19 had a width substantially corresponding to the diameter of the beam spot and a nominal depth d of 0.5 microns, with the actual depth of the groove varying accurately in accordance with the video signals being recorded between a minimum depth $d_1$ of 0.2 microns and a maximum depth $d_2$ of 0.8 microns.

After the positive-type photo-resist layer 19 has been developed, the original record disc 18 can be employed for the mass production of large numbers of corresponding video record discs by a procedure similar to that previously described for the mass production of phonograph record discs from an original lacquer record. Each of the resulting video record discs thus mass produced can have the recorded video signals reproduced therefrom by means of a piezo-electric pick-up or other electro-mechanical transducer provided with a stylus tracking the spiral groove and being mechanically actuated by the undulations or irregularities at the bottom of such groove which represent the recorded video signals so as to cause the transducer to generate a corresponding electrical output. Of course, in reproducing the video signals recorded in a video record disc produced by the method according to this invention, the recorded video signals may be detected optically, for example, by a laser or other light beam which is made to track the spiral groove and which is variously reflected by the undulations or irregularities provided at the bottom of such groove to detect the recorded video signals, or such recorded video signals may be detected as variations in electrostatic capacitance.

In another specific example of this invention, the negative-type photo-resist material available commercially under the trade name KOR was employed as the photo-sensitive layer 19 of original record disc 18, and the unmodulated intensity of the laser light beam 12 and the degree of modulation thereof by the video signals to be recorded were selected so that the minimum and maximum intensities of the laser light beam impinging on the surface of the photoresist layer were 1 milliwatt and 2 milliwatts, respectively. With all other parameters of the method being the same as previously described for the method employing the positive-type photo-resist, the negative-type photo-resist layer, after development, was found to have a spiral ridge extending from its surface with the width of such ridge being approximately 3 microns, and with the height of the ridge corresponding accurately to the recorded video signals and varying between a minimum height of 2 microns and a maximum height of 8 microns. In mass producing video record discs from the last mentioned original record disc, the surface of the developed negative-type photo-resist may be metalized and then electroplated for directly obtaining the so-called master from which a mother and then a stamper may be produced in turn by the usual techniques involved in the mass production of phonograph record discs. The video record discs mass produced from the stamper corresponding to the original record disc having a negative-type photo-resist as its photo-sensitive layer may have the video signals recorded therein reproduced in the same way as has been described above in connection with the video record discs produced from an original record disc having a positive-type photo-resist as its photo-sensitive layer.

Although positive- and negative-type photo-resist materials have been specifically described above as being suitable to form the photo-sensitive layer 19 of the record medium or disc 18 employed in the method embodying this invention, other photo-sensitive record mediums may be similarly used. For example, the photo-sensitive record medium may be formed of a sublimate material, such as, lead iodide, tungsten oxide or germanium sulfide. Such sublimate materials produce a vaporific photo-reacted substance as a result of heat generated by the absorbtion of light. Moreover, the mentioned sublimate materials have a very large photo-absorbtion coefficient so that, if the thermal diffusion therefrom is small, vaporization of the sublimate material proceeds from the surface thereof in the direction of the depth of the layer of sublimate material in accordance with the intensity of the modulated laser light beam which scans the original record disc or record medium. Thus, an original record disc having a sublimate material as the photo-sensitive layer 19 thereon produces an end result similar to that achieved when the photo-sensitive layer is constituted by a positive-type photo-resist, as described above.

The photo-sensitive record medium 19 of an original record disc employed in the method according to this invention may also be constituted by a photo-thermoplastic material, such as, for example, a photo-thermoplastic material constituted by a first layer formed of a mixture of diphenylsilicone and polyphenyleneoxide deposited on the surface of the glass disc 20 and a second or outer layer formed of a mixture of trinitrofluorenone and polyvinylcarbinol deposited over the first layer.

The laser light source 11 is selected, for example, from among krypton, helium-cadmium and argon lasers, so as to produce a laser light beam having characteristics that desirably correspond to the sensitivity of the selected photo-sensitive material employed as the record medium. Furthermore, in place of the electro-optic crystal employed in the above described light modulator 13, the intensity modulation of the laser light beam in accordance with the signals to be recorded may be effected by making use of the light defraction effect produced by an ultrasonic wave.

In producing a contoured tracking path, i.e. a groove or ridge, in, or on the surface of the photo-sensitive layer 19 of original record disc 18, as described above, the intensity distribution across the laser light beam may be suitably varied, for example, by means of a lens, filter or the like, so as to provide the resulting groove or ridge with a rectangular, parabolic, triangular or other desired cross-sectional configuration.

In the above described embodiments of this invention, only a single laser light beam has been employed for producing the tracking path portion and the recorded signal portion on the original record disc 18. However, as shown schematically on FIGS. 6A and 6B, two or more light beams can be used for producing the tracking path portion and the recorded signal portion on the photo-sensitive record medium. More specifically, in the embodiment of FIG. 6A, a first laser light beam 12a of constant intensity is reflected against the surface of the photo-sensitive record medium 18 by a semi-reflecting mirror 35 so as to produce the tracking groove or ridge of the record medium. A second laser light beam 12b is passed through a light modulator 13 so as to have its intensity modulated by means of the video or other signals applied to the modulator, whereupon the modulated laser light beam 12b is reflected by a mirror 36 so as to pass through the semi-reflecting mirror 35 and be combined with the beam 12a of constant intensity. Thus, the light energies of the beam 12a of constant intensity and of the modulated beam 12b are added together with the modulated beam 12b determining the variations in the depth of the groove or the height of the ridge that is eventually formed on the record medium.

Figure 6B:
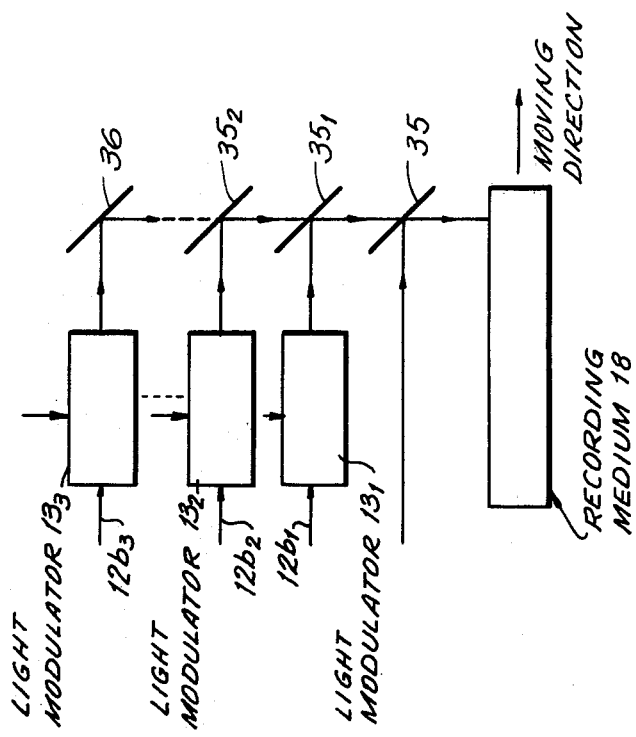
FIGS. 6A and 6B are schematic views illustrating other respective embodiments of the method according to the invention.

Referring now to FIG. 6B, it will be seen that the method according to the present invention may also be employed for recording a plurality of signals in the photo-sensitive record medium 18 simultaneously with the forming of a tracking groove or ridge thereon. More specifically, in the embodiment of FIG. 6B a laser light beam 12a of constant intensity is directed against the surface of the photo-sensitive record medium 18 by the semi-reflecting mirror 35, and three additional laser beams $12b_1$, $12b_2$ and $12b_3$ are passed through respective light modulators $13_1$, $13_2$ and $13_3$ having respective signals applied thereto for modulating the intensities of the respective laser light beams. The intensity modulated beams $12b_1$, $12b_2$ and $12b_3$ are respectively reflected by semi-reflecting mirrors $35_1$ and $35_2$ and by a mirror 36 so as to be combined with the beam 12a of constant intensity. Thus, in the method illustrated by FIG. 6B, the beam 12a of constant intensity determines the groove or ridge formed on the photo-sensitive record medium 18, while the intensity modulated beams $12b_1$, $12b_2$ and $12b_3$ record the respective signals as undulations or irregularities at the bottom of the groove or at the top of the ridge.

Figure 6A:
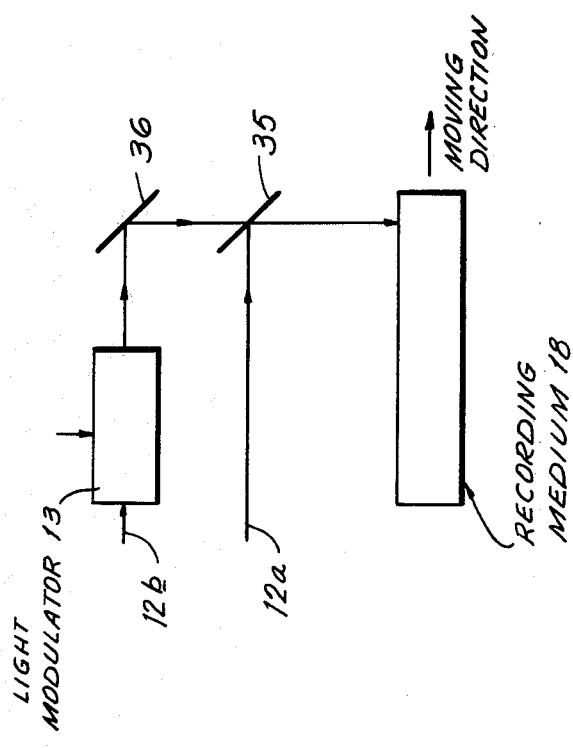

Since the light energies of the beams 12a and 12b on FIG. 6A and of the beams 12a, $12b_1$, $12b_2$ and $12b_3$ on FIG. 6B are added together in acting on the photo-sensitive record medium, it is necessary in accordance with the present invention that the sum of the light energies of the plurality of beams be in the range, for example, as indicated at $I_1$ and $I_2$ on FIG. 5, within which the extent to which the photo-sensitive record medium is photo-reacted corresponds linearly to the variation of the total light energy.

In producing the plurality of light beams employed in the embodiments of FIGS. 6A and 6B, the output of a single laser or other light source may be suitably divided into a plurality of beams so that all of the beams will be of the same wavelength, or the several light beams may be produced by respective light sources which may or may not have the same wavelength. The light energies of the plurality of light beams directed against the photo-sensitive record medium may be added together by directing all of the light beams at the same spot on the record medium, for example, as by the mirrors 35 and 36 on FIG. 6A and by the mirrors 35, $35_1$, $35_2$ and 36 on FIG. 6B. Alternatively, the several light beams may be directed to impinge against the surface of the photo-sensitive record medium at respective locations which are spaced apart along the locus of the relative movement of the record medium and light beams so that the energies of the plurality of light beams are added together, i.e. the light beams are combined, by the time integral, that is, each point along the spiral path on the original record disc or medium 18 is scanned successively by all of the beams. The last mentioned method for adding together the light energies of the plurality of light beams is particularly desirable when the several light beams are produced by dividing a laser light beam emenating from a single source so that the several light beams all have the same wave form. If such light beams derived from the same laser source have their respective light energies added together by being directed against a common spot on the photo-sensitive record medium, as on FIGS. 6A and 6B, the several light beams have different path lengths which give rise to an interference effect. If variations occur in such interference effect due to an external disturbance, the varying interference effect is recorded as a noise. However, if the light beams derived from a single laser source are directed at spaced locations lying along a locus of the relative movement of the light beams and record medium so as to have their light energies added together by the time integral, the path lengths of the several light beams can be made identical so as to eliminate the described interference effect and the possible recording of noise.

The embodiments of the invention in which two or more light beams are employed, as described above, are particularly advantageous in that the light intensity for determining the nominal depth or height of the tracking groove or ridge to be produced on the original record disc 18 is easily established by suitably selecting the intensity of the non-modulated light beam. Further, if the interference effect between the several light beams is avoided, as described above, the composition of the light energies corresponding to the respective signals to be recorded on the photo-sensitive record medium becomes a simple addition, and the possibility of cross-modulation due to non-linearity of the light modulator or modulators is avoided.

It will be apparent that, in all of the above described emdobiments of the invention, the laser light beam or light beams are effective to produce a tracking path and to record the signal or signals therein on the photo-sensitive record medium without requiring physical contact with the latter, as in the cutting of a groove in the record medium. Therefore, the recording speed is not limited by frictional problems and can be greatly increased so as to be the same or even greater than the speed at which the recorded signals will be eventually reproduced. Thus, for example, when recording NTSC video signals, the original record disc 18 forming the photo-sensitive record medium on FIG. 1 can be rotated at the speed of 1,800 r.p.m. for recording one frame of the video signals in each turn of the spiral tracking groove or ridge. If desired, the rotational speed of the original record disc 18 may be greatly increased, for example, to 3,600 r.p.m. so as to reduce the recording time, in which case the incoming video signals are supplied to each light modulator 13 by way of a suitable frequency converter so that, although the recording time is cut in half, the final video record discs can be reproduced or played back at the standard speed of 1,800 r.p.m. for NTSC video signals. Further, since the production of the tracking groove or ridge and the recording of signals therein are effected simultaneously, there is no need to provide a tracking control during the recording operation. The foregoing is to be distinguished from previously existing recording methods in which the record medium is first formed with a tracking groove and thereafter the signal to be recorded is applied to the record medium along a locus determined by tracking of the previously formed groove.

It will also be apparent that the methods according to this invention facilitate the recording of high frequency signals, as contrasted with the limitations inherent in mechanical cutting of an original record disc. Furthermore, the width of the groove formed in the original record disc 18 may be made very small, for example, in the range from 3 to 10 microns, so that a high recording density may be achieved on the record disc. Finally, the recording of the original record disc 18 by means of one or more light beams can be effected in the atmosphere, as contrasted with recording by an electron beam, so that the apparatus for practicing the method according to this invention can be relatively compact and simple.

Having described illustrative embodiments of this invention with reference to the accompanying drawings, it is understood that the invention is not limited to those precise embodiments, and that various changes and modifications may be effected therein by one skilled in the art without departing from the scope or spirit of the invention as defined in the appended claims.

What is claimed is:

1. A method of making a record disc formed of physical analog undulations in a tracking path in a surface layer of the disc by optically producing a reproducible recording of relatively high frequency signals comprising the steps of: providing a photo-sensitive record disc in the form of said surface layer on a rotatable base plate with a substantially flat surface of a photo-sensitive material which, when subjected to light impinging on said surface, is photo-reacted to a depth which varies substantially linearly in correspondence with the intensity of the light over a predetermined range of light intensities; directing at least one beam of light against said substantially flat surface of said photo-sensitive record disc with the quiescent intensity of said light beam at said surface in the absence of modulation thereof being a constant value within said range; moving said record disc and light beam relative to each other for scanning of said surface by said light beam; and during said scanning, modulating the intensity of at least said one light beam by the signals to be recorded with the degree of modulation of the light beam intensity by said signals being selected to maintain the maximum and minimum intensities of said light beam after said modulation within said range for forming simultaneously on said photo-sensitive record disc, upon development if required with said photo-sensitive material, a contoured tracking path portion whose depth is linearly proportional to the intensity of said light beam in the absence of modulation and a recorded signal portion which is unified with said trackiing path portion, said recorded signal portion appearing as physical undulations whose magnitude is linearly proportional to said intensity of said light beam after modulation.

2. The method according to claim 1; in which said photo-sensitive material is a photo-resist; and further comprising the steps of developing said surface of the photo-resist after said scanning thereof by the modulated light beam.

3. The method according to claim 2; in which said photo-resist is of the positive type so that, as a result of said developing thereof said tracking path portion is obtained in the form of a groove and said recorded signal portion is constituted by irregularities at the bottom of said groove.

4. The method according to claim 3; in which, during said scanning, said base plate is rotated and said light beam and base plate are moved relative to each other in the radial direction of the base plate so that said groove defines a spiral in said surface of the photo-resist layer.

5. The method according to claim 1; in which, during said scanning, said base plate is rotated and said light beam and base plate are moved relative to each other in the radial direction of the base plate so that said tracking path portion defines a spiral on said photo-sensitive material.

6. The method according to claim 1; in which an additional, unmodulated beam of light of said constant value intensity is directed against said surface of the photo-sensitive record disc.

7. The method according to claim 6; in which said additional, unmodulated light beam and the first mentioned light beam are combined with each other following the modulation of the latter by the signals to be recorded.

8. The method according to claim 1; in which each said light beam is composed of substantially monochromatic light.

9. The method according to claim 1; in which each said light beam is of the laser type.

10. The method according to claim 1; in which said base plate is rotated at a constant rotational speed while said light beam and base plate are moved relative to each other in a direction that extends radially in respect to the axis of rotation of the base plate for effecting said scanning of the record disc by said light beam; and in which the intensity of said light beam impinging on said surface of the record disc is further varied in accordance with said relative movement of the light beam and base plate in said radial direction to compensate for differences in the linear speed of said surface at varying distances from said axis of rotation.

* * * * *